(12) United States Patent
Smith (10) Patent No.: US 10,688,738 B2
(45) Date of Patent: Jun. 23, 2020

(54) WIND TURBINE BLADES

(71) Applicant: VESTAS WIND SYSTEMS A/S, Aarhus N. (DK)

(72) Inventor: Jonathan Smith, Hampshire (GB)

(73) Assignee: Vestas Wind Systems A/S, Aarhus N. (DK)

( * ) Notice: Subject to any disclaimer, the term of this patent is extended or adjusted under 35 U.S.C. 154(b) by 146 days.

(21) Appl. No.: 15/031,884

(22) PCT Filed: Oct. 23, 2014

(86) PCT No.: PCT/DK2014/050348
§ 371 (c)(1),
(2) Date: Apr. 25, 2016

(87) PCT Pub. No.: WO2015/058775
PCT Pub. Date: Apr. 30, 2015

(65) Prior Publication Data
US 2016/0263844 A1    Sep. 15, 2016

(30) Foreign Application Priority Data
Oct. 25, 2013    (GB) .................... 1318852.9

(51) Int. Cl.
*B29C 70/54*    (2006.01)
*B29C 70/52*    (2006.01)
(Continued)

(52) U.S. Cl.
CPC .......... *B29C 70/547* (2013.01); *B29C 69/007* (2013.01); *B29C 70/083* (2013.01);
(Continued)

(58) Field of Classification Search
CPC ..... B29C 70/547; B29C 70/083; B29C 70/20; B29C 70/528; B29C 70/525;
(Continued)

(56) References Cited

U.S. PATENT DOCUMENTS 4,207,129 A * 6/1980 Tadewald .............. B29C 70/025
156/242
4,752,513 A * 6/1988 Rau ........................ B29C 70/085
156/166

(Continued)

FOREIGN PATENT DOCUMENTS

CN         1915649 A    2/2007
CN       102116253 A    7/2011
(Continued)

OTHER PUBLICATIONS

Machine Translation of FR 1387857 A. (Year: 1965).*
(Continued)

*Primary Examiner* — Leith S Shafi
(74) *Attorney, Agent, or Firm* — Wood Herron & Evans LLP (57) ABSTRACT

A pultrusion process for making a strip for an elongate reinforcing structure of a wind turbine blade, the process comprising drawing fibres (42) and resin through a pultrusion die (40) in a process direction to form a strip (102); and applying an infusion-promoting layer (110) to a surface of the strip down-stream from the die in the process direction. A pultrusion apparatus is also disclosed.

16 Claims, 4 Drawing Sheets

(51) Int. Cl.
*B29C 69/00* (2006.01)
*B29C 70/08* (2006.01)
*B29C 70/20* (2006.01)
*F03D 1/06* (2006.01)
*B29D 99/00* (2010.01)
*B29C 70/86* (2006.01)
*B29K 105/08* (2006.01)
*B29K 105/10* (2006.01)
*B29K 309/08* (2006.01)
*B29L 31/08* (2006.01)

(52) U.S. Cl.
CPC ............ *B29C 70/20* (2013.01); *B29C 70/525* (2013.01); *B29C 70/528* (2013.01); *F03D 1/0675* (2013.01); *B29C 70/865* (2013.01); *B29D 99/0028* (2013.01); *B29K 2105/0881* (2013.01); *B29K 2105/106* (2013.01); *B29K 2309/08* (2013.01); *B29K 2313/00* (2013.01); *B29L 2031/085* (2013.01); *F05B 2230/23* (2013.01); *F05B 2280/6003* (2013.01); *F05B 2280/6015* (2013.01); *Y02E 10/721* (2013.01)

(58) Field of Classification Search
CPC ..... B29C 69/007; B29C 70/865; B29C 65/70; B29C 70/52; B29C 70/543; B29C 70/546; F03D 1/0675; F03D 13/10; B29L 2031/085; B29K 2313/00; B29K 2105/106; B29K 2105/0881; B29K 2309/08; F05B 2230/23; F05B 2280/6015; F05B 2280/6003; Y02E 10/721; B29D 99/0028; B29D 99/0007; Y02P 70/523; Y10T 29/49339; Y10T 428/24488; B32B 2603/00; B32B 3/02; B32B 3/263
USPC .................... 29/889.71; 416/230; 264/258
See application file for complete search history.

(56) References Cited

U.S. PATENT DOCUMENTS

| | | | |
|---|---|---|---|
| 5,876,553 A † | 3/1999 | Kaiser | |
| 6,007,655 A † | 12/1999 | Gorthala | |
| 6,264,781 B1 * | 7/2001 | Bott | B29C 70/525 156/178 |
| 2002/0106469 A1 * | 8/2002 | Fanucci | B29C 70/083 428/36.9 |
| 2008/0159871 A1 * | 7/2008 | Bech | F03D 1/065 416/229 R |
| 2011/0135485 A1 | 6/2011 | Wang | |
| 2013/0134621 A1 * | 5/2013 | Tsotsis | B29B 11/16 264/177.2 |

FOREIGN PATENT DOCUMENTS

| | | |
|---|---|---|
| DE | 10014376 A1 | 7/2001 |
| EP | 2341239 A2 † | 7/2011 |
| FR | 1387857 A | 2/1965 |
| GB | 2497578 A | 6/2013 |
| WO | 2006082479 A1 | 8/2006 |
| WO | 2012161741 A2 | 11/2012 |
| WO | 2013178228 A1 | 12/2013 |

OTHER PUBLICATIONS

European Patent Office, International Search Report and Written Opinion issued in International Patent Application No. PCT/DK2014/050348 dated Jan. 28, 2015.
Intellectual Property Office, Combined Search and Examination Report issued in Application No. GB1318852.9 dated May 14, 2014.
Government of India, Examination Report in in Application No. 201617015829 dated Mar. 5, 2019.
The State Intellectual Property Office of China, First Notification of Office Action in CN Application No. 201480070862.X, dated Feb. 3, 2017.
The State Intellectual Property Office of China, 2nd Notification of Office Action in CN Application No. 201480070862.X, dated Nov. 1, 2017.

\* cited by examiner
† cited by third party

WIND TURBINE BLADES

FIELD OF THE INVENTION

The present invention relates generally to rotor blades for wind turbines and to methods of manufacturing wind turbine blades. More specifically, the present invention relates to wind turbine blades that include a stack of load-bearing reinforcing strips integrated within the structure of the shell, and to a method of making such blades.

BACKGROUND OF THE INVENTION

Figure 1:
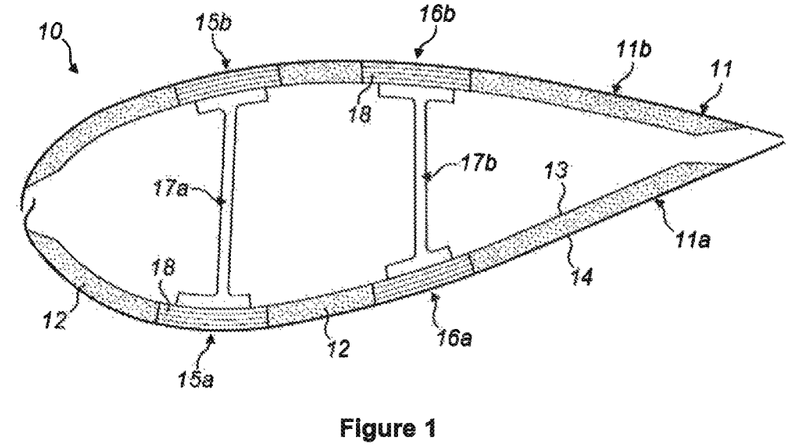

FIG. 1 is a cross-sectional view of a wind turbine rotor blade 10. The blade has an outer shell 11, which is fabricated from two half shells: a windward shell 11a and a leeward shell 11b. The shells are moulded from glass-fibre reinforced plastic (GRP). Parts of the outer shell 11 are of sandwich panel construction and comprise a core 12 of lightweight foam (e.g. polyurethane), which is sandwiched between inner 13 and outer 14 GRP layers or 'skins'.

The blade 10 comprises a first pair of spar caps 15a and 15b and a second pair of spar caps 16a and 16b. The respective pairs of spar caps 15a and 15b, 16a and 16b are arranged between sandwich panel regions 12 of the outer shell 10. One spar cap 15a, 16a of each pair is integrated with the windward shell 11a and the other spar cap 15b, 15b of each pair is integrated with the leeward shell 11b. The spar caps of the respective pairs are mutually opposed and extend longitudinally along the length of the blade 10.

A first longitudinally-extending shear web 17a bridges the first pair of spar caps 15a and 15b and a second longitudinally-extending shear web 17b bridges the second pair of spar caps 16a and 16b. The shear webs 17a and 17b in combination with the spar caps 15a and 15b and 16a and 16b form a pair of I-beam structures, which transfer loads effectively from the rotating blade 10 to the hub of the wind turbine. The spar caps 15a and 15b and 16a and 16b in particular transfer tensile and compressive bending loads, whilst the shear webs 17a and 17b transfer shear stresses in the blade 10.

Each spar cap 15a and 15b and 16 and 16b has a substantially rectangular cross section and is made up of a stack of pre-fabricated reinforcing strips 18. The strips 18 are pultruded strips of carbon-fibre reinforced plastic (CFRP), and are substantially flat and of rectangular cross section. The number of strips 18 in the stack depends upon the thickness of the strips 18 and the required thickness of the shell 11, but typically the strips 18 each have a thickness of a few millimetres and there may typically be between four and twelve strips in the stack. The strips have a high tensile strength, and hence have a high load bearing capacity.

The integration of the spar caps 15a and 15b and 16a and 16b within the structure of the outer shell 11 avoids the need for a separate spar cap such as a reinforcing beam, which is typically bonded to an inner surface of the shell in many conventional wind turbine blades. Other examples of rotor blades having spar caps integral with the shell are described in EP 1 520 983, WO 2006/082479, GB 2497578 and WO 2013/087078.

The wind turbine blade 10 shown in FIG. 1 is made using a resin-infusion (RI) process, whereby the various laminate layers of the shell 11 are laid up in a mould cavity, the cavity is sealed, and a vacuum is applied to the cavity. Resin is then introduced to the cavity, and the vacuum pressure causes the resin to flow over and around the laminate layers and to infuse into the interstitial spaces between the layers. To complete the process, the resin-infused layup is cured to harden the resin and bond the various laminate layers together to form the blade 10.

The pultruded reinforcing strips 18 described above tend to have a relatively smooth and flat outer surface, which is a feature of the pultrusion process. As a result, when the strips are stacked one on top of the other in the mould, there is very little interstitial space between the strips 18. Typically, the space between the strips is between approximately 0.1 and 0.3 mm. This lack of space makes it difficult for resin to infuse between the strips 18, and can result in a poor bond being formed between adjacent strips 18 in the stack. If the strips 18 are not properly bonded together there is a risk of delamination occurring in the blade structure, which may lead to failure of the blade 10 in use. This problem is not limited to pultruded strips 18, but may exist when other types of reinforcing strips having a smooth outer surface are stacked.

Figure 2:
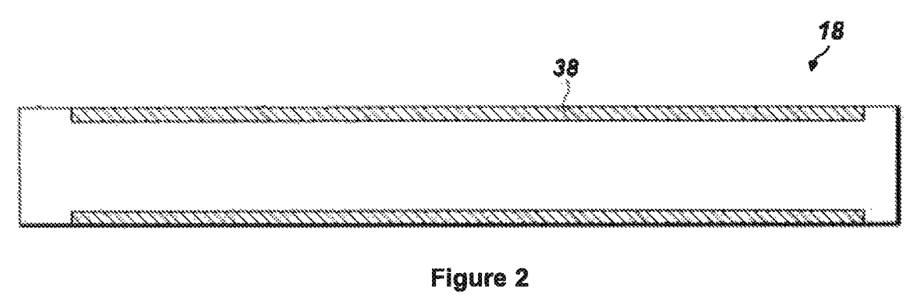

One known method for obtaining a surface that is more suitable for bonding is to provide a 'peel ply' layer 38 on the upper and lower surfaces of the pultruded reinforcing strip 18 as illustrated in FIG. 2, which can be removed to form a textured surface comprising irregularly arranged peaks and troughs. The textured surface provides space at the interface between the stacked strips 18, allowing resin to infiltrate more easily between the strips 18, for example by capillary action.

Such peel plies 38 are made of a tightly-woven fabric, typically a polyamide, which is coated with a release agent. The tight weave of the fabric and the release agent prevent the peel ply bonding to the resin in the strip, so that the peel ply can be removed easily.

Figure 3:
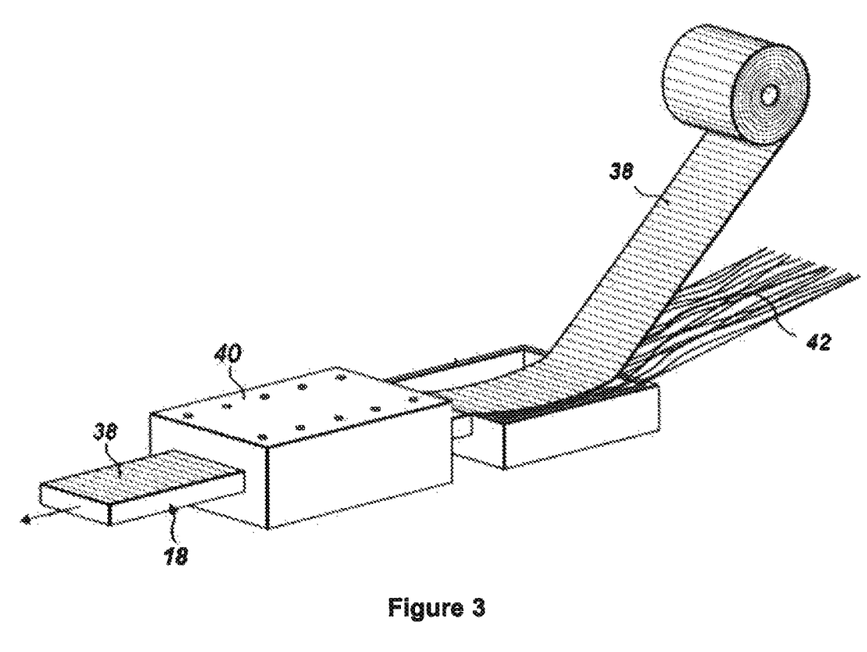

As illustrated in FIG. 3, the peel ply 38 is applied to the strip 18 during the pultrusion process. The peel ply 38 is drawn through a die 40 together with the fibres 42 and the resin that will form the strip 18. The strip 18 is then cured. When the peel ply 38 is removed, it removes a layer of cured resin from the surface of the strip 18, thereby providing the textured surface.

Although the use of peel ply layers 38 aids with resin infusion, there are some problems associated with the use of peel ply layers 38. The peel ply layers 38 must be removed from each strip 18 by hand before the strips 18 are laid in the mould, which is cumbersome and time consuming, and prolongs the manufacturing process Furthermore, because the surfaces left behind by removal of the peel ply layers 38 are rough and irregular, contact between the strips 18 is similarly irregular. Contact may be peak-to-peak (i.e. between peaks on the textured surfaces of neighbouring strips 18 in the stack), which spaces the strips 18 further apart to provide a relatively large interstitial space in which resin flows relatively easily, or contact may be peak-to-trough (i.e. between a peak on the surface of one strip and a trough on the surface of a neighbouring strip 18 in the stack) which holds the strips 18 closer together to provide a relatively small amount of interstitial space in which resin flow is relatively slow. The amount of interstitial space, and hence the resin flow rate, therefore varies across the strips 18, which can lead to air becoming trapped between the strips 18, which weakens the bond between the strips 18.

It is an object of the invention to mitigate or overcome at least one of the problems of the prior art.

SUMMARY OF THE INVENTION

Against this background, and from a first aspect, the invention resides in a pultrusion process for making a strip for an elongate reinforcing structure of a wind turbine blade, the process comprising: drawing fibres and resin through a pultrusion die in a process direction to form a strip and applying an infusion-promoting layer to a surface of the strip down-stream from the die in the process direction.

A strip made according to the pultrusion process of the invention therefore has an infusion-promoting layer applied to at least one surface. When a plurality of strips are stacked one on top of another to form an elongate reinforcing structure, this infusion-promoting layer is disposed between neighbouring strips in the stack. Resin can infuse easily within the infusion-promoting layer, and hence can infuse easily between neighbouring strips in the stack. This reduces the possibility of forming air pockets between the strips, which would otherwise act as crack initiators. Thus, an elongate reinforcing structure that incorporates strips made according to the pultrusion process of the invention can bear a greater load than an elongate reinforcing structure incorporating conventional strips.

The pultrusion process may comprise bonding the infusion-promoting layer to the surface of the strip.

To bond the infusion-promoting layer to the surface of the strip without the need for an adhesive, the pultrusion process may comprise applying the infusion-promoting layer to the surface of the strip when the strip is in an uncured or semi-cured state, and curing the strip to bond the infusion-promoting layer to the surface of the strip.

Alternatively, the process may comprise curing the strip before applying the infusion-promoting layer to the surface of the strip. In this case, an adhesive layer may be applied to the surface of the strip after curing the strip and before applying the infusion-promoting layer. To obtain a thin and even distribution of adhesive layer, the process may comprise spraying the adhesive layer onto the surface of the strip.

The infusion-promoting layer may be a fibrous layer, such as a glass fabric layer. A fibrous layer is particularly advantageous, as the fibrous structure provides gaps in the layer through which resin can infuse particularly easily. To provide sufficiently large gaps, the infusion-promoting layer may have a fibre density of between approximately 100 grams per square metre and 300 grams per square metre.

The pultrusion process may comprise applying the infusion-promoting layer to an upper surface or a lower surface of the pultruded strip. In this way, only one infusion-promoting layer need be used for each strip, and when a plurality of strips are stacked together, a single infusion-promoting layer is disposed between neighbouring strips to promote resin infusion.

The pultrusion process may comprise applying a first infusion-promoting layer to an upper surface of the pultruded strip, and applying a second infusion-promoting layer to a lower surface of the pultruded strip. In this way, when a plurality of strips are stacked together, two infusion-promoting layers are disposed between neighbouring strips to promote resin infusion even further.

The strip may have a length of between approximately 2 metres and approximately 1000 metres. In particular, the strip may have a length of between approximately 10 metres and approximately 150 metres, and in preferred embodiments the strip may have a length of between approximately 10 metres and approximately 80 metres. The length may be dictated by the length of the elongate reinforcing structure into which the strip is to be incorporated, or it may be dictated by, for example, the manufacturing process of the elongate reinforcing structure.

From another aspect, the invention resides in a pultrusion apparatus for making a strip for an elongate reinforcing structure for a wind turbine blade, the pultrusion apparatus comprising a pultrusion die, a drawing device for drawing fibres and resin through the pultrusion die in a process direction to form a strip, and an application station for applying an infusion-promoting layer to a surface of the strip, wherein the application station is arranged in-line with the pultrusion die and down-stream from the pultrusion die in the process direction.

The application station may comprise a roller for applying the infusion-promoting layer to the surface of the strip. The roller provides a means for mechanising the application of the infusion-promoting material, reducing the need for manual input. The roller can also be used to apply pressure to the infusion-promoting material as it is applied to the strip.

The pultrusion apparatus may comprise an adhesive station configured to apply an adhesive layer to the surface of the strip. The adhesive station may be arranged in-line with the pultrusion die and between the pultrusion die and the application station. The adhesive station provides a means for mechanising the adhesive application process, reducing the need for manual input.

For particularly quick and uniform application of the adhesive, the adhesive station may be configured to spray an adhesive layer onto the surface of the strip.

The pultrusion apparatus may comprise a heating device for curing the strip. The heating device may be arranged up-stream from the adhesive application station in the process direction. In this way, the strip may be cured and the adhesive may be applied to the strip in a continuous process.

The pultrusion apparatus may comprise first and second application stations arranged on opposite sides of the strip and configured respectively to apply a respective infusion-promoting layer to respective upper and lower surfaces of the strip.

The invention also extends to a strip made according to the pultrusion process described above, or using the pultrusion apparatus described above.

The invention extends further to an elongate reinforcing structure for a wind turbine blade comprising a strip made according to the pultrusion process described above, or using the pultrusion apparatus described above.

From another aspect, the invention resides in a method of making an elongate reinforcing structure for a wind turbine blade, the method comprising: providing a plurality of strips made according to the pultrusion process described above, or using the pultrusion apparatus described above; forming a laminate by stacking the plurality of strips in a mould tool; infusing resin through the laminate; and curing the resin to form the elongate reinforcing structure.

The invention extends to an elongate reinforcing structure for a wind turbine blade made according to the above method, to a wind turbine blade comprising such an elongate reinforcing structure, and to a wind turbine comprising such a wind turbine blade.

BRIEF DESCRIPTION OF THE DRAWINGS

Reference has already been made to FIGS. 1 to 3 of the drawings. In order that the invention might be more readily understood, reference will now be made, by way of example only, to the remainder of the drawings, in which.

DETAILED DESCRIPTION OF EMBODIMENT OF THE INVENTION

Figure 4A:
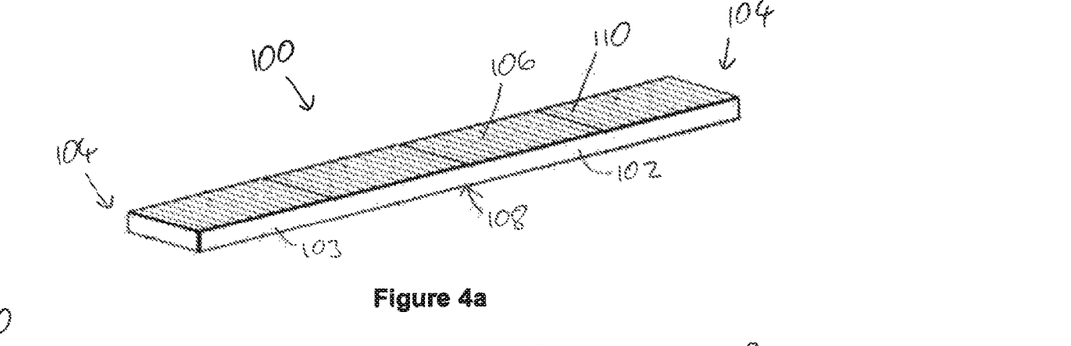
FIGS. 4a and 4b are perspective and front views respectively of a strip according to an embodiment of the invention for an elongate reinforcing structure of a wind turbine blade according to an aspect of the invention.
Figure 4B:
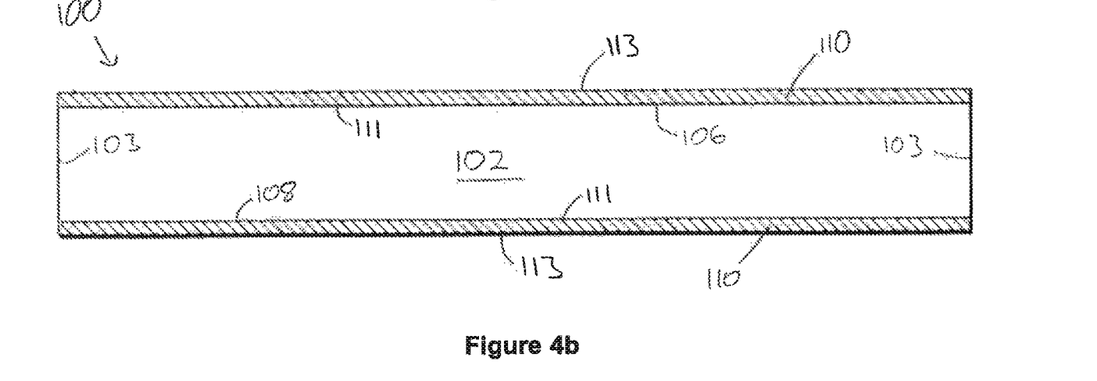

FIGS. 4a and 4b show a strip 100 for an elongate reinforcing structure for a wind turbine blade. In the embodiment described, the elongate reinforcing structure is a spar cap, similar to that described above in relation to FIG. 1.

The strip 100 is a pultruded strip of fibre-reinforced polymeric material 102 that extends longitudinally between opposed ends 104. The pultruded strip 102 comprises sides 103, and upper and lower surfaces 106, 108. Each of the upper and lower surfaces 106, 108 is provided with an infusion-promoting layer 110 that is bonded to the respective upper or lower surface 106, 108.

The infusion-promoting layers 110 cover the entirety of the upper and lower surfaces 106, 108 of the pultruded strip 102. In particular, the infusion-promoting layers 108 extend continuously between the ends 104 of the strip 102 in a longitudinal direction, and continuously between the sides 103 of the strip 110 in a transverse direction.

Figure 5:
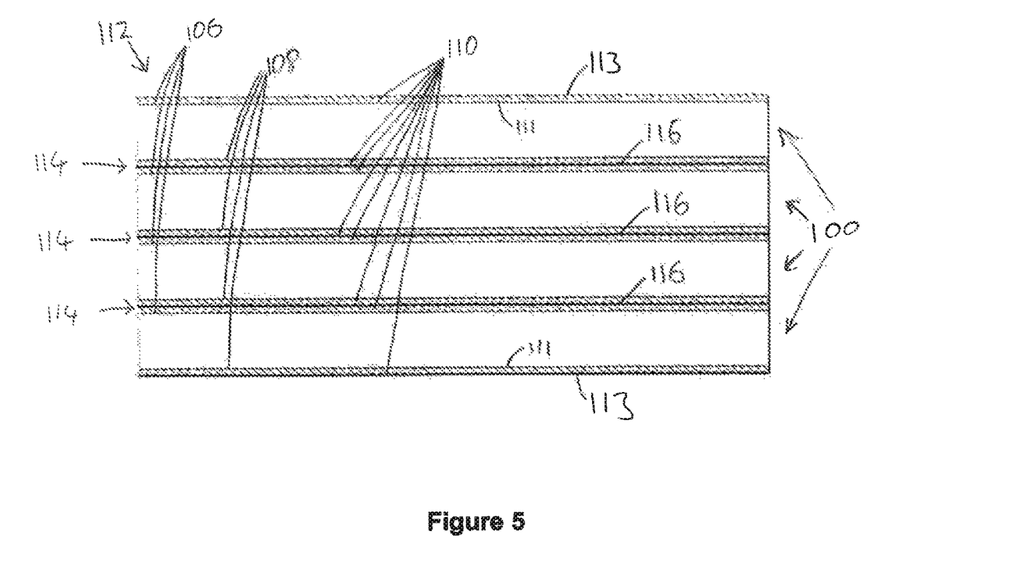
FIG. 5 is a front view of the strip of FIG. 4 arranged in a stack with a plurality of similar strips.

To integrate the strip 100 into a spar cap, as shown in FIG. 5, a plurality of strips 100 are stacked one-on-top-of-another to form a stack 112 in a mould (not shown). The strips 100 are stacked with the upper surface 106 of one strip 100 facing the lower surface 108 of a neighbouring strip 100 in the stack 112. In this way, the outer surfaces 113 of the infusion-promoting layers 110 of neighbouring strips 100 are in contact with one another. Together, the adjacent infusion-promoting layers 110 form an infusion region 114 between each pair of neighbouring strips 100.

Once the strips 100 have been arranged in the stack 112, resin is introduced to the stack 112. The resin infiltrates around the stack 112 and also between the strips 110 in the stack 112 via the infusion regions 114 between the strips 100.

Figure 6:
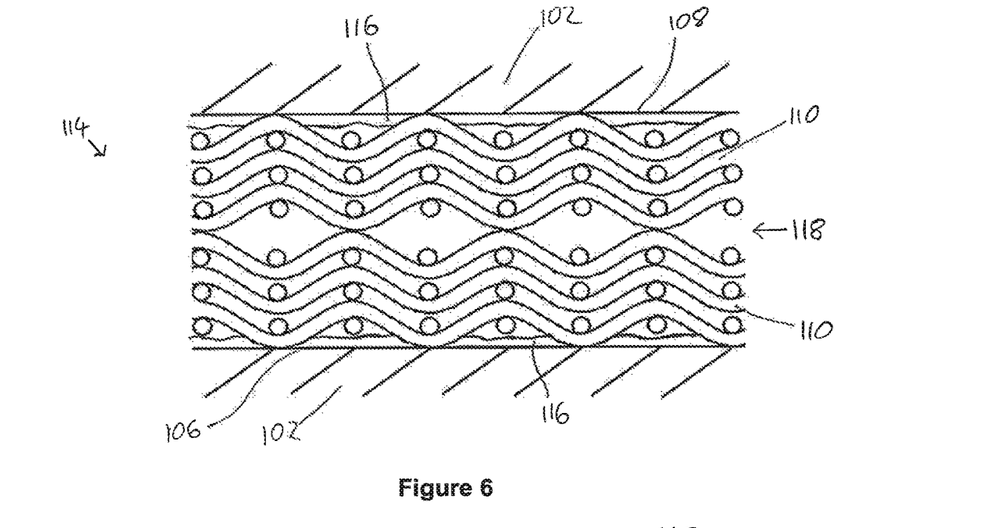
FIG. 6 is an enlarged front view of an infusion region between two strips in the stack of FIG. 5.

FIG. 6 shows the infusion-promoting layer 110 and the infusion region 114 in greater detail, and reveals that the infusion-promoting layer is a fibrous layer having a relatively loose weave.

In the embodiment shown, the infusion-promoting layer 110 is a layer of glass fibre material, and specifically is a layer of Hexcel weave glass fibre fabric having a density of 200 grams per square metre (gsm).

The fibre density of the glass fibre material is relatively low; for example between approximately 100 and approximately 300 gsm. In particular, the fibre density of the glass fibre material is sufficiently low that resin is able to infuse relatively easily among the glass fibres, so that the layer of glass fibre material enhances resin flow. The fibre density is also sufficiently low to allow the glass fibre material to bond to the surface 106, 108 of the pultruded strip 102.

The infusion-promoting layer 110 presents an inner surface 111 and an outer surface 113. The inner surface 111 is bonded to the upper or lower surface 106, 108 of the pultruded strip 102, for example by means of an adhesive layer 116. The outer surface 113 forms the external surface of the strip 100. The outer surface 113 is textured due to the fibrous nature of the infusion-promoting layer 110. When strips 100 are placed one on top of another, this textured surface serves to space the strips 100 apart, increasing the size of the interstitial space between the strips 100 and further facilitating resin flow between the strips 100.

The adhesive layer 116 does not penetrate all the way into the infusion-promoting layer 110, but remains only in a region of the infusion-promoting layer 110 that is nearest the pultruded strip 102. In this way, the spaces between the fibres of the infusion-promoting layer 110 are not blocked by the adhesive, and are instead open to receive infusing resin. In other words, and in contrast to a peel ply layer, the infusion-promoting layer is a dry fabric and is not infused with resin.

Furthermore, the relatively loose weave of the infusion-promoting layer 110 provides relatively large spaces between the fibres of the weave, so that resin can infuse easily within the infusion-promoting layers 110, and hence can infuse easily through the infusion region 114 between neighbouring strips 100.

FIG. 6 also reveals that between the adjacent infusion-promoting layers 110 is an interstitial space 118. The interstitial space 118 is relatively large, which allows relatively fast flow of resin between the strips 100.

The weave of the fibres in the infusion-promoting layers 110 is uniform across the entirety of the infusion-promoting layers 110, meaning that the resin flow rate is correspondingly uniform. The uniform weave also means that the peaks and troughs provided by the weave are regularly arranged, such that the interstitial space 118 is substantially uniform across the entire strip 100. This further helps to ensure a uniform resin flow rate. Thus, the resin flow rate is uniform across the entire infusion region 114, such that when resin is introduced between the strips 100, the resin can more easily penetrate the entirety of the infusion region 114, reducing the chances of air pockets forming between the strips 100.

After the resin has been infused between and around the strips 100 in the stack 112, the resin is cured by heating the mould, and the spar cap is fully formed. The infusion-promoting layers 110 are therefore integrated into the finished spar cap as structural elements that lie between each pair of neighbouring pultruded strips 102 in the stack 112. This is in contrast to peel ply, which is removed from the surface of a strip before the strip is stacked.

Figure 7:
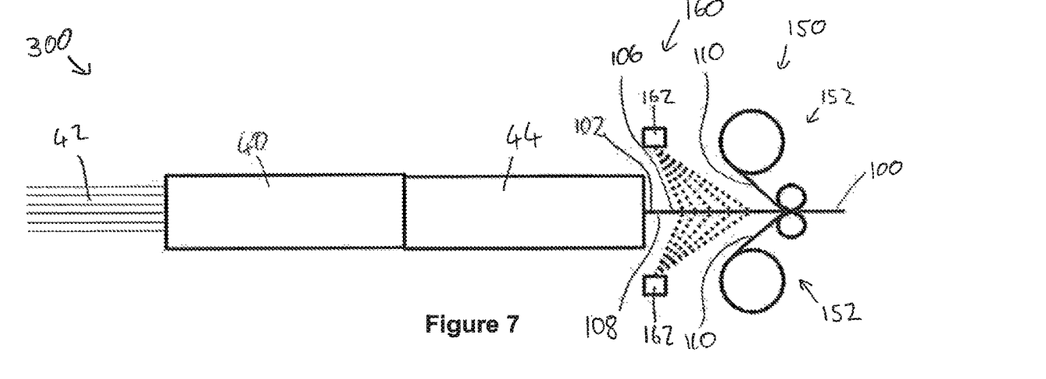
FIG. 7 is a schematic of a method of making the strip of FIGS. 4a and 4b according to another embodiment of the invention.

Referring now to FIG. 7, the strip 100 described above is made by a pultrusion process using a pultrusion apparatus 300. Resin-soaked fibres 42 are drawn through a standard pultrusion die 40 in a process direction P to form the pultruded strip 102. The pultruded strip 102 then enters a curing oven 44, where the pultruded strip 102 is heated to cure the resin.

Downstream of the curing oven 44 is an adhesive application station 160. The adhesive application station 160 comprises two adhesive sprayers 162, one arranged above the pultruded strip 102 and one arranged below the pultruded strip 102. The adhesive sprayers 162 spray an adhesive layer 116 (see FIG. 6), such as a layer of epoxy resin, onto the upper and lower surfaces 106, 108 of the pultruded strip 102.

Downstream of the adhesive application station 160 is an application station 150 that applies the infusion-promoting layers 110 to the upper and lower surfaces 106, 108 of the strip 102.

The application station 150 comprises two roller systems 152, one arranged above the pultruded strip 102 and one arranged below the pultruded strip 102. The roller systems 152 store the infusion-promoting layers 110, and apply the layers 110 to the upper and lower surfaces 106, 108 of the pultruded strip 102 respectively. The infusion-promoting layers 110 adhere to the upper and lower surfaces 106, 108 of the pultruded strip 102 by means of the adhesive layer 116.

Once the infusion-promoting layers 110 have been applied, the final strip 100 is ready for use in making a spar cap, or for transportation to a manufacturing or storage facility.

Figure 8:
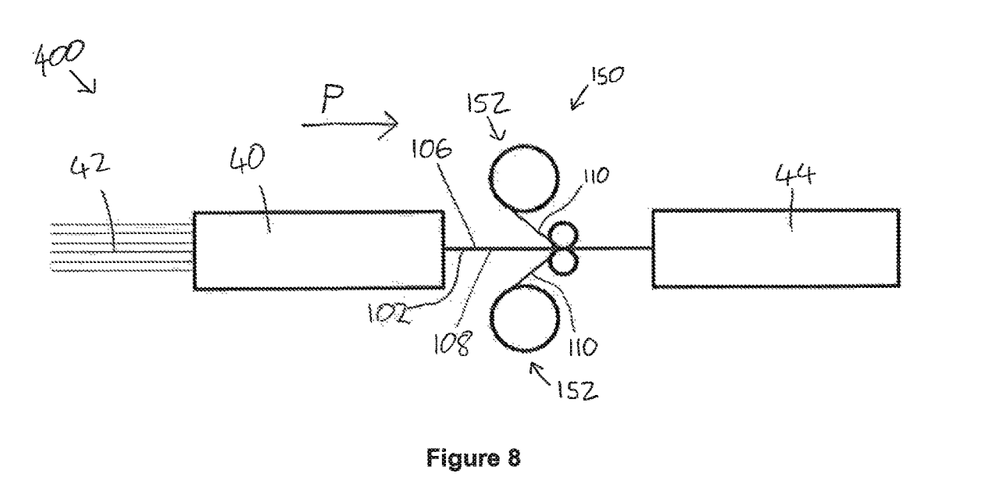
FIG. 8 is a schematic of another method of making the strip of FIGS. 4a and 4b.

An alternative method of making the strip 100, using an alternative pultrusion apparatus 400 is illustrated in FIG. 8. In this method, resin-soaked fibres 42 are pultruded through the pultrusion die 40 in the same way, but the pultruded strip 100 is then moved directly to the application station 150, which is substantially identical to the layer application station 150 already described.

Because the pultruded strip 102 has not yet been cured when the infusion-promoting layers 110 are applied, the upper and lower surfaces 106, 108 of the pultruded strip 102 are tacky. This allows the infusion-promoting layers 110 to adhere to the upper and lower surfaces 106, 108 without the need for an additional adhesive.

The resin in the pultruded strip 102 only infiltrates into the infusion-promoting layers 110 by a short distance, and hence only infiltrates into a small region of the infusion-promoting layer 110 that is near the pultruded strip 102. This is because in the absence of a vacuum there is relatively little driving force for resin infusion. Thus the fibres of the infusion-promoting layers 110 do not become saturated with resin, and the spaces between the fibres remain open to receive resin during a later resin infusion process.

The pultruded strip 102, with the infusion-promoting layers 110 applied to its upper and lower surfaces 106, 108, is moved to a curing oven 44, where the pultruded strip 102 is heated to cure the resin. As the resin is cured, the infusion-promoting layers 110 are bonded to the pultruded strip 102. Once cured, the strip 100 is then ready for use in a spar cap.

In alternative versions of the method, the strip may be semi-cured before the infusion-promoting layers 110 are applied, so as to ensure that the upper and lower surface 106, 108 have a suitable level of tackiness for adhesion.

Figure 9:
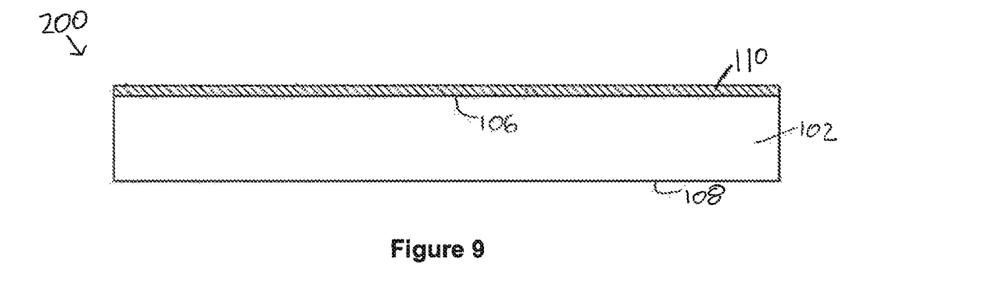
FIG. 9 is a front view of a strip according to another embodiment of the invention for an elongate reinforcing structure of a wind turbine blade.

FIG. 9 illustrates an alternative strip 200 for use in an elongate reinforcing structure of a wind turbine blade. The strip 200 is similar to the strip 100 described above, but in this case an infusion-promoting layer 110 is bonded only to the upper surface 106 of the pultruded strip 102, while the lower surface 108 is exposed to the surroundings.

Figure 10:
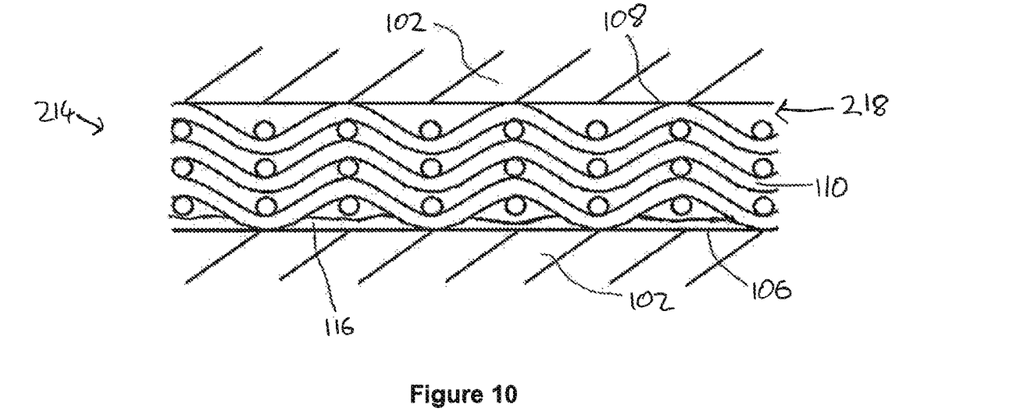
FIG. 10 is an enlarged front view of an infusion region formed between the strip of FIG. 9 and another strip, when the strips are arranged in a stack.

As illustrated in FIG. 10, when the strip 200 is stacked with other similar strips 200, the infusion-promoting layer 110 lies against the lower surface 108 of a neighbouring strip 200 in the stack. In this way, an infusion region 214 is created between the strips 200 in the stack, in a manner similar to that already described.

FIG. 10 shows the infusion region 214 in greater detail. In this case, the infusion region 214 comprises a single infusion-promoting layer 110. An interstitial space 218 is created between the infusion-promoting layer 110 and the lower surface 108 of the neighbouring strip 200 in the stack. The infusion region 214 enhances the infusion of resin between the strips 200, and does so substantially uniformly, as has already been described above.

Figure 11:
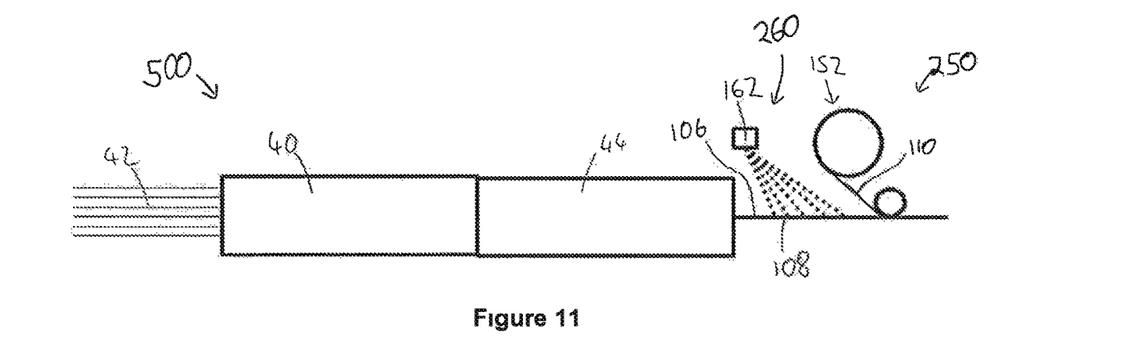
FIG. 11 is a schematic of a method of making the strip of FIG. 9 according to another embodiment of the invention.

FIG. 11 shows apparatus 500 for making a strip 200 having a single infusion-promoting layer 110. The apparatus 500 is similar to that already described above, but is configured to bond the infusion-promoting layer 110 only to the upper surface 106 of the pultruded strip 102.

Resin-soaked fibres 42 are pulled through the pultrusion die 40 to form the pultruded strip 102 in the manner already described. The pultruded strip 102 is then fed to the curing oven 44 for curing.

Next, the pultruded strip 102 is fed to the adhesive application station 260. The adhesive application station 260 comprises an adhesive sprayer 162 arranged above the pultruded strip 102. The adhesive sprayer 162 sprays an adhesive layer 116 (see FIG. 6), such as a layer of epoxy resin, onto the upper surface 106 of the pultruded strip 102.

The strip 102 is then fed to an application station 250. The application station 250 comprises a roller system 152 arranged above the pultruded strip 102. The roller system 152 carries the infusion-promoting layer 110, and applies the layer 110 to the upper surface 106 of the pultruded strip 102. The infusion-promoting layer 110 adheres to the upper surface 106 of the pultruded strip 102 by means of the adhesive layer 116, as has been described.

Figure 12:
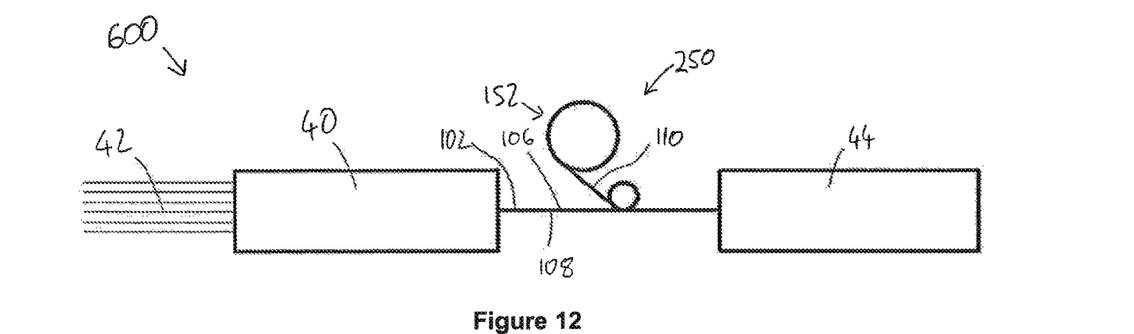
FIG. 12 is a schematic of another method of making the strip of FIG. 9.

FIG. 12 illustrates an alternative apparatus 600 for making a strip 200 having a single infusion-promoting layer 110. In this apparatus 600, resin-soaked fibres 42 are pultruded through the pultrusion die 40 to form the pultruded strip 102.

The strip 102 is then fed to a layer application station 250. The application station 250 comprises a roller system 152 arranged above the pultruded strip 102. The roller system 152 carries the infusion-promoting layer 110, and applies the layer 110 to the upper surface 106 of the pultruded strip 102. As has been described above, the upper surface 106 of the pultruded strip 102 is tacky, so that the infusion-promoting layer 110 adheres to the upper surface 106. This method therefore avoids the need for a specific adhesive application stage.

The pultruded strip 102, with the infusion-promoting layer 110 applied to its upper surface 106, is moved to a curing oven 44, where the pultruded strip 102 is heated to cure the resin, thereby bonding the infusion-promoting layer 110 to the upper surface 106 of the pultruded strip 102.

Although in the embodiments described the infusion-promoting layer is a layer of glass fibre material, it will be appreciated that this need not be the case. The infusion-promoting layer may be a fibrous layer that is made of a different material, such as carbon, glass, aramid, polyester, nylon. The fibrous layers may be woven, uni-axial, multi-axial, fleece, or they may be continuous filament. Alternatively, the infusion-promoting layer may be a perforated or porous layer.

In embodiments where an adhesive layer is used, the adhesive layer need not be an epoxy layer, but may be any suitable adhesive.

The spar cap or other elongate reinforcing structure may be made by stacking the strips and carrying out a resin infusion process in a mould tooling, and the resulting spar cap or other elongate reinforcing structure may then be integrated into the blade. In other embodiments, the strips may be stacked directly in a mould for a blade half with other structural components of the blade, and the resin infusion process may be applied to the entire blade half, such that the spar cap is both formed and integrated into the blade half simultaneously.

The present invention is therefore not limited to the exemplary embodiments described above and many other variations or modifications will be apparent to the skilled person without departing from the scope of the present invention as defined by the following claims.

The invention claimed is:

1. A method of making a wind turbine blade, the method comprising:
   providing a plurality of strips, each strip made by a pultrusion process comprising:
      drawing fibres and resin through a pultrusion die in a process direction to form a pultruded strip; and
      applying a resin-free, infusion-promoting layer to a surface of the pultruded strip down-stream from the die in the process direction,
   placing the plurality of strips in a wind turbine blade mould tool to form a stack having at least one infusion-promoting layer between two pultruded strips, wherein each infusion-promoting layer remains substantially resin-free when the plurality of strips is placed in the wind turbine blade mould tool;
   infusing resin into the wind turbine blade mould tool such that the resin infiltrates around the stack and between the pultruded strips via each infusion-promoting layer; and
   curing the resin to form the wind turbine blade.

2. The method of claim 1, comprising bonding the infusion-promoting layer to the surface of the pultruded strip.

3. The method of claim 2, comprising applying the infusion-promoting layer to the surface of the pultruded strip when the pultruded strip is in an uncured or semi-cured state, and curing the pultruded strip to bond the infusion-promoting layer to the surface of the pultruded strip.

4. The method of claim 1, comprising curing the pultruded strip before applying the infusion-promoting layer to the surface of the pultruded strip.

5. The method of claim 4, comprising applying an adhesive layer to the surface of the pultruded strip after curing the pultruded strip and before applying the infusion-promoting layer.

6. The method of claim 5, comprising spraying the adhesive layer onto the surface of the pultruded strip.

7. The method of claim 1, wherein the infusion-promoting layer is a fibrous layer.

8. The method of claim 7, wherein the infusion-promoting layer is a glass fabric layer.

9. The method of claim 7, wherein the infusion-promoting layer has a fibre density of between approximately 100 grams per square metre and 300 grams per square metre.

10. The method of claim 1, comprising applying the infusion-promoting layer to an upper surface or a lower surface of the pultruded strip.

11. The method of claim 1, wherein the applying a resin-free, infusion-promoting layer to a surface of the pultruded strip includes applying a first, resin-free, infusion-promoting layer to an upper surface of the pultruded strip down-stream from the die in the process direction, and applying a second, resin-free, infusion-promoting layer to a lower surface of the pultruded strip down-stream from the die in the process direction.

12. The method of claim 1, wherein the pultruded strip has a length of between approximately 2 metres and approximately 1000 metres.

13. The method of claim 12, wherein the pultruded strip has a length of between approximately 10 metres and approximately 150 metres.

14. The method of claim 13, wherein the pultruded strip has a length of between approximately 10 metres and approximately 80 metres.

15. The method of claim 1, wherein the pultruded strip is substantially flat and has a substantially rectangular cross-section.

16. A method of making a wind turbine blade, the method comprising:
   providing a plurality of strips, each strip made by a process comprising:
      drawing fibres and resin through a pultrusion die in a process direction to form a pultruded strip; and
      applying a resin-free, infusion-promoting layer to a surface of the pultruded strip down-stream from the die in the process direction,
   placing the plurality of strips in a mould tool to form a stack having at least one infusion-promoting layer between two pultruded strips, wherein each infusion-promoting layer remains substantially resin-free when the plurality of strips is placed in the mould tool;
   infusing resin into the mould tool such that resin infiltrates between the pultruded strips via each infusion-promoting layer;
   curing the resin in the stack of the plurality of strips;
   placing the cured stack in a wind turbine blade mould tool;
   infusing resin into the wind turbine blade mould tool such that the resin infiltrates around the stack; and
   curing the resin to form the wind turbine blade.

* * * * *